United States Patent Office.

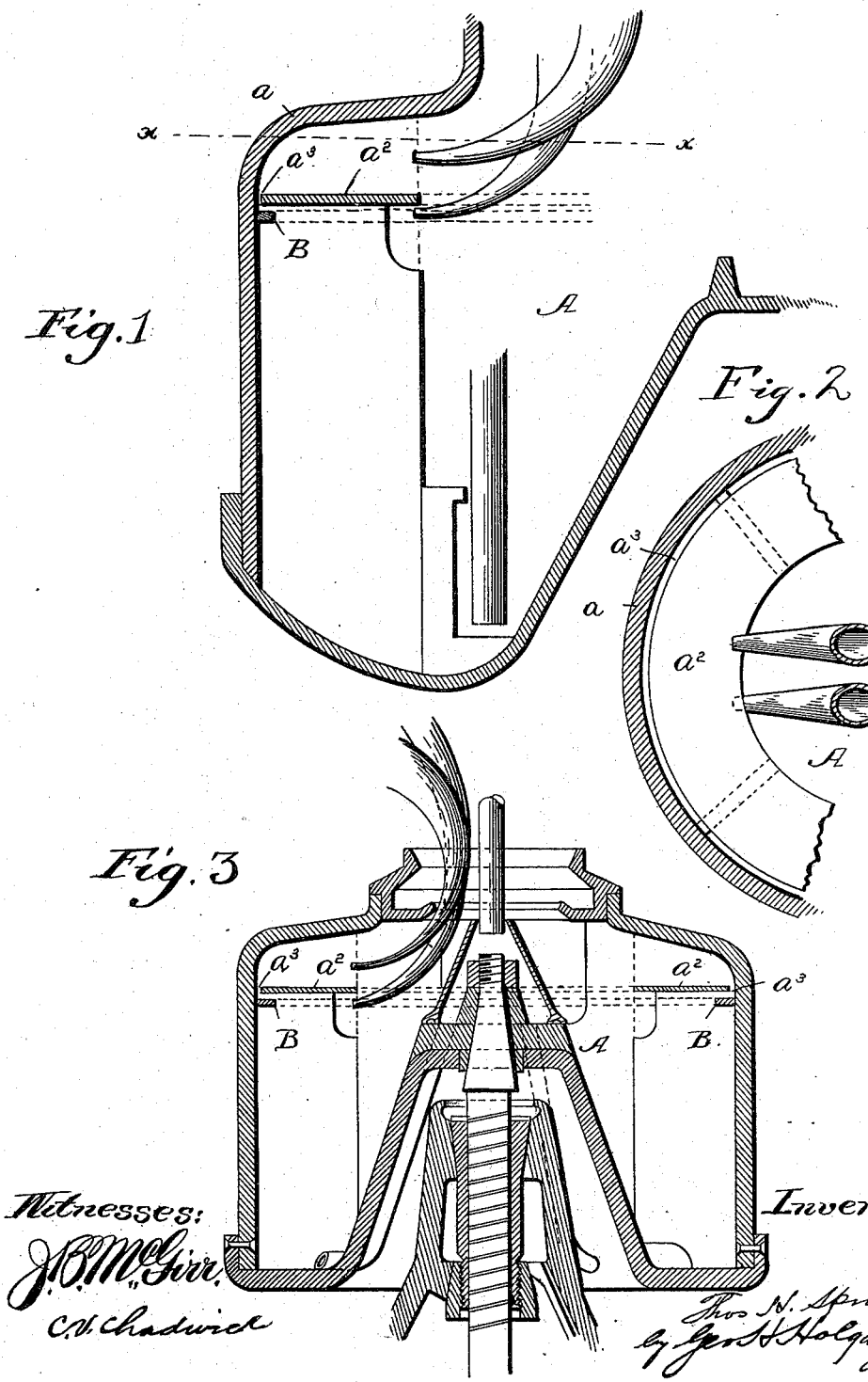

THOMAS H. SPRINGER, OF PHILADELPHIA, PENNSYLVANIA, ASSIGNOR, BY DIRECT AND MESNE ASSIGNMENTS, TO THE SPRINGER SEPARATOR COMPANY, INCORPORATED, OF SAME PLACE.

DIRT-ARRESTER FOR LIQUID-SEPARATORS.

SPECIFICATION forming part of Letters Patent No. 573,833, dated December 22, 1896.

Application filed October 5, 1894. Serial No. 525,005. (No model.)

*To all whom it may concern:*

Be it known that I, THOMAS H. SPRINGER, a citizen of the United States, residing at Philadelphia, in the county of Philadelphia and State of Pennsylvania, have invented certain new and useful Improvements in Scum and Dirt Arresters for Centrifugal Machines for Separating Liquids, of which the following is a specification.

The invention relates to improvements in centrifugal machines for separating liquids.

The object is to produce a device by which the outlet or outlets of a separator-bowl will be at all times maintained clear and unobstructed and the contained foreign substances of the liquid prevented from accumulating at these points.

With this object in view the invention consists in certain novel construction and arrangement of parts, which will be hereinafter fully described, and pointed out in the claim.

In the accompanying drawings, forming part of this specification, similar letters of reference indicate corresponding parts in the several views, in which—

Figure 1 is a view of a section of a separator-bowl with the improvements applied. Fig. 2 is a sectional view on the line $x\,x$ of Fig. 1. Fig. 3 is a transverse sectional view of the bowl mounted.

In the drawings, A represents the bowl of a centrifugal machine such as is now commonly employed for separating liquids, the machine illustrated being particularly adapted for skimming milk.

Referring to Fig. 1, the bowl $a$ is shown as provided with a skim-ring $a^2$, which is of a diameter slightly less than the interior of the bowl, so as to leave a space or opening $a^8$ between its circumference and the inner wall of the bowl, said ring being secured to the partitions or wings. This opening serves as the outlet for the skim-milk, and heretofore the capacity of machines of this class has been greatly reduced by the deposit of foreign substance contained in the milk accumulating rapidly at the outlet and either wholly or partially closing the opening. This reduction in the size of the outlet often resulted in bending and forcing the skim-ring out of position by the action of the milk in forcing a passage.

B represents the arrester, which is preferably of metal in the form of a ring or flange, and is designed to be secured around the inner wall of the bowl at a suitable distance from the outlet. It is essential that the width of the ring be as great, if not greater, than the outlet-openings, so that rise of the foreign substance will be effectually checked and the outlet thereby kept clear of deposit.

Having thus described my invention, what I claim as new, and desire to secure by Letters Patent, is—

In a liquid-separating machine a bowl having inlet and exit tubes a skim-ring supported on a partition within the bowl and being of smaller diameter than the inside of the bowl and whereby an annular passage is formed between the ring and the bowl and a metallic ring secured to the wall of the bowl below the skim-ring at such a distance as to prevent the passage of dirt and the like, as and for the purpose described.

In testimony whereof I have hereunto affixed my signature in the presence of two subscribing witnesses.

THOMAS H. SPRINGER.

Witnesses:
R. S. REED,
EDW. C. BROADBENT.